US006952319B2

(12) United States Patent
Weiehelt et al.

(10) Patent No.: US 6,952,319 B2
(45) Date of Patent: Oct. 4, 2005

(54) WRITING POSITION DATA EX SITU USING AN ACTUATOR RETRACTABLE BY A RETRACTABLE SUPPORT ELEMENT

(75) Inventors: Brent Melvin Weiehelt, Burnsville, MN (US); Lon Buske, Apple Valley, MN (US); Mark August Toffle, St. Louis Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 490 days.

(21) Appl. No.: 10/003,506

(22) Filed: Oct. 31, 2001

(65) Prior Publication Data

US 2002/0181139 A1 Dec. 5, 2002

Related U.S. Application Data

(60) Provisional application No. 60/295,275, filed on Jun. 1, 2001, and provisional application No. 60/314,039, filed on Aug. 22, 2001.

(51) Int. Cl.[7] ................................................ G11B 21/02
(52) U.S. Cl. ........................................................ 360/75
(58) Field of Search ................................ 360/75, 77.03, 360/51, 77.02, 254.4, 254.5, 250, 254, 254.3

(56) References Cited

U.S. PATENT DOCUMENTS 5,023,737 A 6/1991 Yeager
5,162,955 A 11/1992 Burdenko
5,283,705 A 2/1994 Iwabuchi
5,448,429 A * 9/1995 Cribbs et al. ................. 360/75
5,610,777 A * 3/1997 Dang et al. ............. 360/77.03
5,764,437 A 6/1998 Meyer et al.
5,771,130 A * 6/1998 Baker .......................... 360/75
5,831,795 A 11/1998 Ma et al.
6,115,214 A 9/2000 Allsup et al.
6,411,459 B1 * 6/2002 Belser et al. ................. 360/75
6,469,859 B1 * 10/2002 Chainer et al. ............... 360/75
6,476,995 B1 * 11/2002 Liu et al. ....................... 360/75
6,587,293 B1 * 7/2003 Ding et al. ................... 360/51
6,631,046 B2 * 10/2003 Szita et al. ................... 360/75

* cited by examiner

*Primary Examiner*—David Hudspeth
*Assistant Examiner*—Fred F. Tzeng
(74) *Attorney, Agent, or Firm*—Fellers, Snider, et al.

(57) ABSTRACT

An ex-situ Servo Track Writer (STW) uses a support element that can extend between discs in a stack, and can also retract, permitting a high level of variation in the stack's positioning. The support element preferably has an engagement surface that is wide enough to permit the element to support the actuator throughout the element's range of (rotary) motion. Because the support structure is retractable, it can use low angles of approach like those of hyperbolic-shaped cams, without losing access to the outermost portions of the discs. The support structure may therefore be moved out of the servowriter actuator's path while position data is written to the outermost portions of the data surface.

31 Claims, 5 Drawing Sheets

WRITING POSITION DATA EX SITU USING AN ACTUATOR RETRACTABLE BY A RETRACTABLE SUPPORT ELEMENT

RELATED APPLICATIONS

This application claims priority of U.S. provisional application Ser. No. 60/295,275 filed Jun. 1, 2001. This application claims the benefit of Provisional Application No. 60/314,039 filed Aug. 22, 2001.

FIELD OF THE INVENTION

This application relates generally to data storage devices and more particularly to recording position data onto discs thereof.

BACKGROUND OF THE INVENTION

Disc drives are data storage devices that store digital data in magnetic form on a rotating disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers mounted to a radial actuator for movement of the heads relative to the discs. During a data write operation sequential data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per inch). Increased track density requires more closely-spaced, narrow tracks and therefore enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo-track writer ("STW") assembly during the manufacture of the disc drive. One conventional STW assembly records servo pattern on the discs following assembly of the disc drive. In this embodiment, the STW assembly attaches directly to a disc drive having a disc pack where the mounted discs on the disc pack have not been pre-recorded with servo pattern. The STW does not use any heads of its own to write servo information onto the data surfaces, but uses the drive's own read/write heads to record the requisite servo pattern to mounted discs.

In light of the explosive trend toward higher track densities in recent years, some exceeding 100,000 tracks per inch, this conventional method has become excessively time consuming. As the trend continues, it will apparently be necessary for every disc drive manufacturer to obtain and operate much larger numbers of STW's to maintain comparable numbers of disc drives. One strategy to mitigate this need is to utilize multi-disc "ex situ" STW's, which are are capable of recording servo patterns to multiple discs mounted in a stack. After writing some of the position information using (dedicated) servo recording heads, sequentially or simultaneously, the discs are then removed and loaded into disc drives for use. The disc drives write additional position information.

Several problems have made the use of ex situ writers commercially unfeasible. For example, it is not feasible to unload their servowriter heads onto a textured landing zone after servowriting.

To support cost effective ex situ STW operation in high volume, what is needed is a workable system for unloading an actuator that can extend between discs in a stack for load/unload, and retract for easy removal of the disc stack. The present invention provides a solution to this and other problems, and offers other advantages over the prior art.

SUMMARY OF THE INVENTION

Servo Track Writers implementing the present invention use a support element that can extend between discs in the stack, and can also retract, permitting a high level of variation in the stack's positioning. In a preferred embodiment, the support element has an engagement surface that is wide enough to permit the element to support the actuator throughout the element's range of motion. For precise and cost effective operation, the element may also use a rotary actuator for a rigidly limited range of motion, preferably with an axis of rotation substantially parallel to those of the disc stack and the actuator.

Because the support structures are retractable, they can use low angles of approach (like those of hyperbolic-shaped cams) without losing access to the outermost portions of the discs. Disc drive ramps typically use an approach angle of 30 to 45 degrees relative to the disc surface, too steep to permit a low-flying STW head from loading without colliding with the disc surface. In a preferred method of the present invention, the support structure is moved out of the servowriter actuator's path while position data is written to the outermost portions of the data surface.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include much detail about how to use "embedded" servo reference marks to position a disc drive's transducers. Neither does it include specific methods for handling pre-written discs or installing them into a disc drive with minimal distortion. Specific materials for constructing components described herein are likewise omitted, typically being a simple matter of design choice.

Definitions and clarifications of certain terms are provided in conjunction with the descriptions below, all consistent with common usage in the art but some described with greater specificity. For example, "position data" refers herein to any data that pertains to a physical location on a media surface such as a track number, a defect table entry, or a servo burst.

Figure 1:
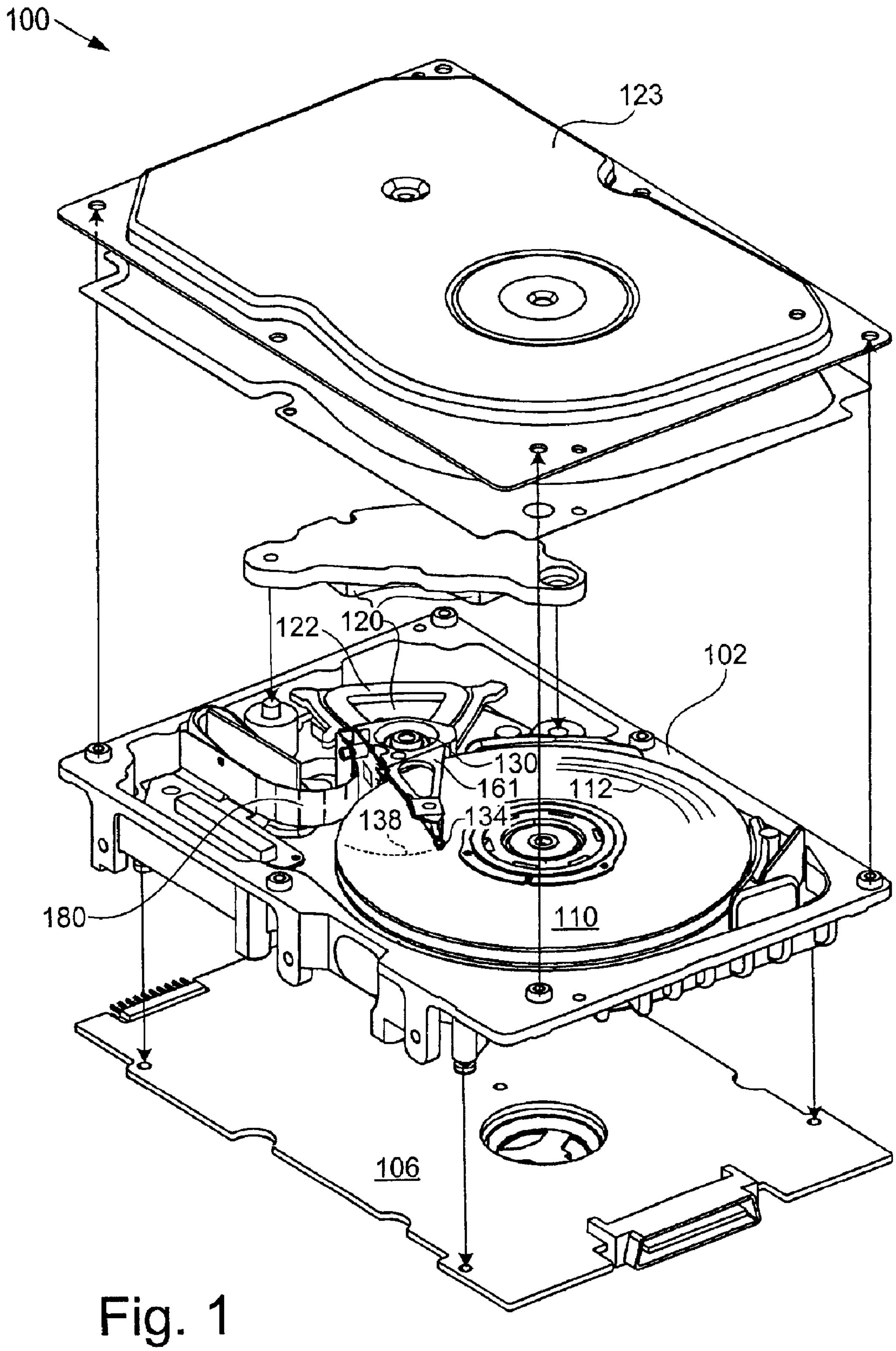
FIG. 1 shows a data storage device containing position data written by means of the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed chamber. The components include a spindle motor which rotates data storage discs 110 at several thousand revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below each disc 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. Flex cable 180 maintains an electrical connection by flexing as transducer heads 134 traverse tracks 112 along their respective radial paths 138. By "radial," it is meant that path 138 is substantially aligned with a radius of the disc(s) 110, although their directions may be offset from a perfectly radial direction by up to about 20 degrees due to head skew, as is understood in the art.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the head 134 and the actuator arm.

Figure 2:
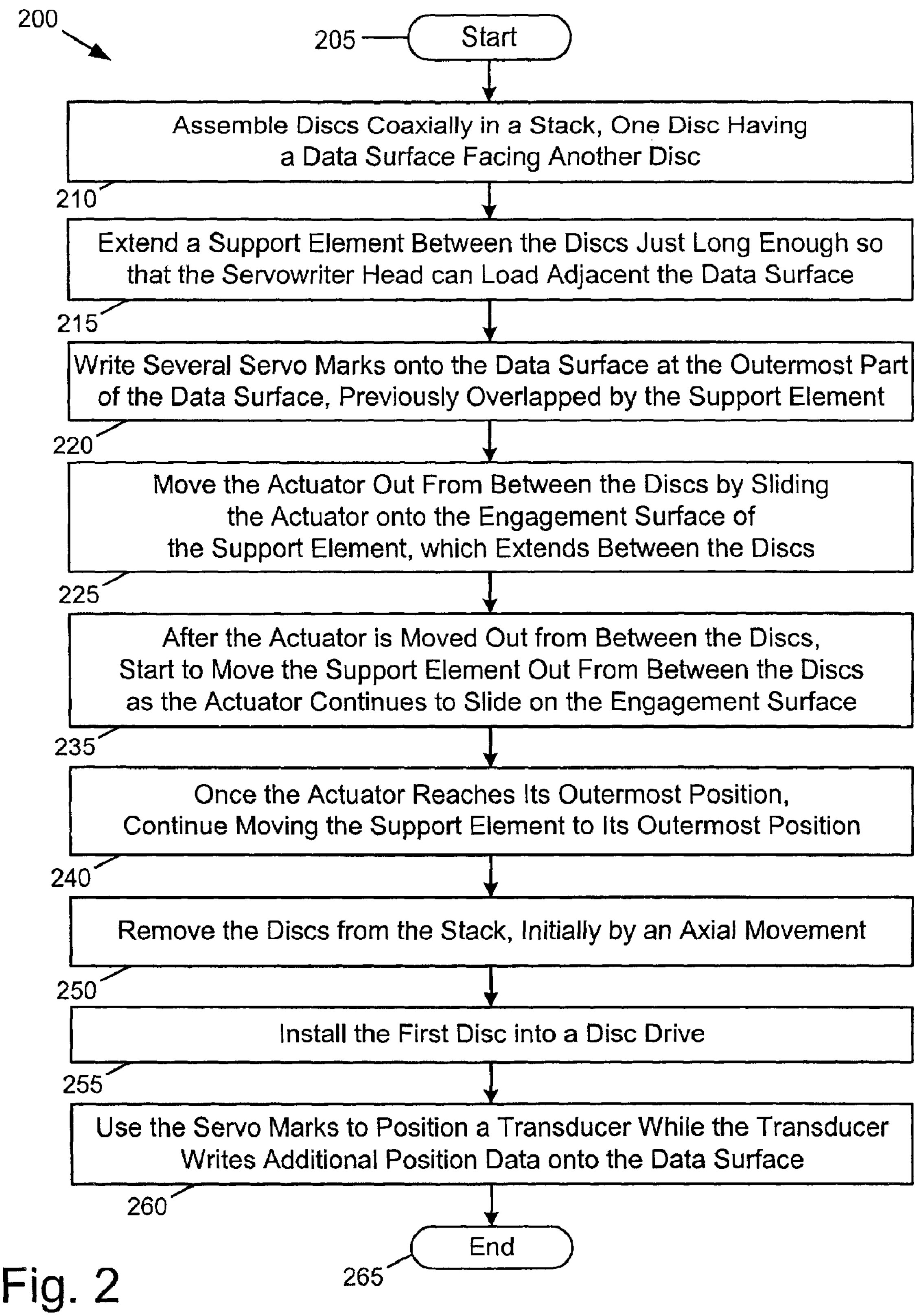
FIG. 2 shows a flowchart of a method of the present invention

FIG. 2 shows a method 200 of the present invention comprising steps 205 through 265. Discs are assembled coaxially (alternated with spacers) into a stack 210. A support element is extended between the discs so that the servowriter head can load 215. A servowriter head (also between discs) writes servo marks onto a data surface 220. (Typically many millions of such servo marks are thus written.) Many suitable techniques for writing servo marks are known in the art. The actuator supporting the head then moves out from between the discs, sliding onto an engagement surface of a support element also extending between the discs 225. After the actuator is moved out from between discs, the support element starts to move out also 235. Each continues moving until it reaches an extreme position in its (limited) range of motion 240. The discs are removed (axially) from the stack 250, and at least one of them is installed into a disc drive 255 (such as 100, which shows two pre-written discs 110). The marks are "pre-written," as are the discs, because the writing precedes installation into the disc drive 100. Finally the pre-written servo marks are used to position the disc drive's transducer(s) as additional position data is written onto the data surface. This may include self-written servo tracks, "Zero Acceleration Path" factors or similar position correction factors, defect tables, and the like.

Figure 3:
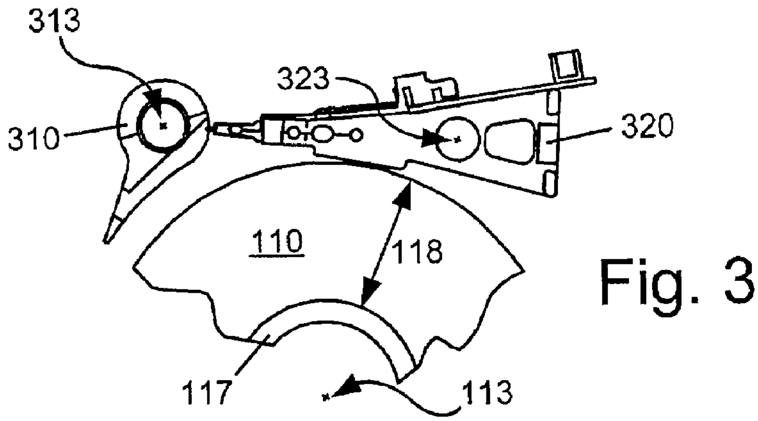
FIGS. 3–5 shows the relative positions of basic components of a Servo Track Writer (STW) configured to implement the present invention, in unloaded, transitional, and loaded positions respectively.
Figure 4:
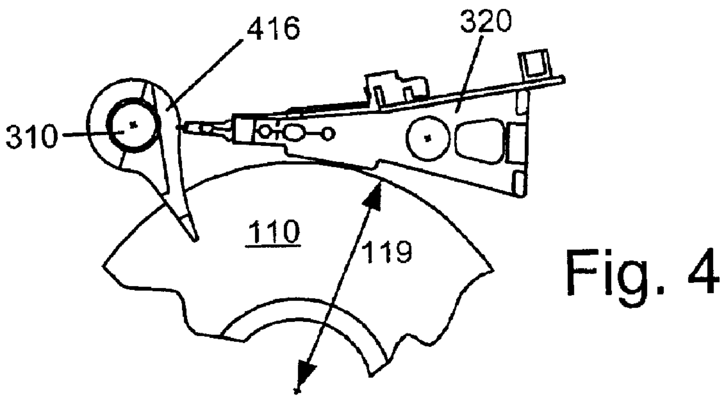
Figure 5:
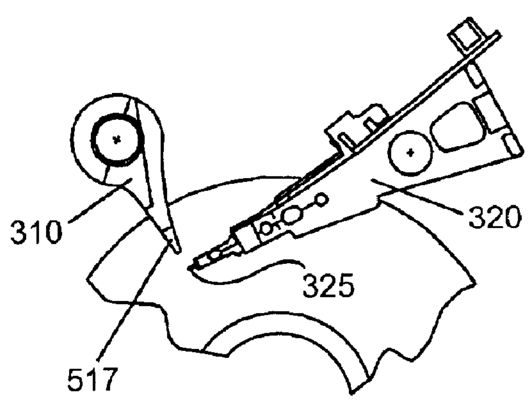

FIGS. 3–5 show basic components of a servo track writer for implementing the present invention. Prior to installation in a disc drive 100, a stack of discs 110 having a nominal radius 119 is positioned for rotation about an axis 113. The discs have a conventional textured landing zone 117 and a useable data surface having a width 118 that is very flat and smooth.

Near the outer circumference of the discs 110 is a servowriter actuator 320 having a load tang 325 on each arm thereof, each load tang 325 resting on an a respective engagement surface 416 of a comb-like support structure 310. Support structure 310 is rotatable about its axis 313, and actuator 320 is rotatable about its axis 323. As the discs begin to rotate (counterclockwise as shown in FIG. 4), support structure 310 likewise rotates counterclockwise until it extends between (and on both ends of) the stack of discs 110. This can occur because the actuator 320 slides along each engagement surface 416. The discs 110 continue to accelerate, meanwhile, to a load velocity so that the actuator can rotate counterclockwise to load the servowriter heads onto (i.e. flying adjacent) the disc 110. Once the heads are loaded, the support structure moves to a partially retracted position about 5 or 10 degrees clockwise from that shown in FIG. 5) and the discs are decelerated by at least 5% for servo writing operations.

The depicted embodiment of FIGS. 3–5 have several advantageous features. Note that the support element 310 is elongated enough to extend between the discs by a distance greater than R/10, where R is the nominal disc radius 119. This elongation permits the engagement surface 416 to include a sloped portion 517 that is less than about 25 degrees, and more preferably about 7 degrees, relative to the disc surface. Ordinarily, approach angles in this range would not be feasible because of the significant portion of the disc rendered inaccessible. Gradual approach angles are desirable, however, because they prevent low flying heads from diving into the disc upon loading. (Servowriter heads that fly at 0.7 to 1.0 microinch or less are highly desirable, for example with magnetic discs, because they make it possible to use a medium having a higher coercivity, which in turn permits higher data density.) Because the present invention makes use of a retractable support element 310, a gradual approach is possible without losing access to the outermost portions of the disc 110.

Figure 6:
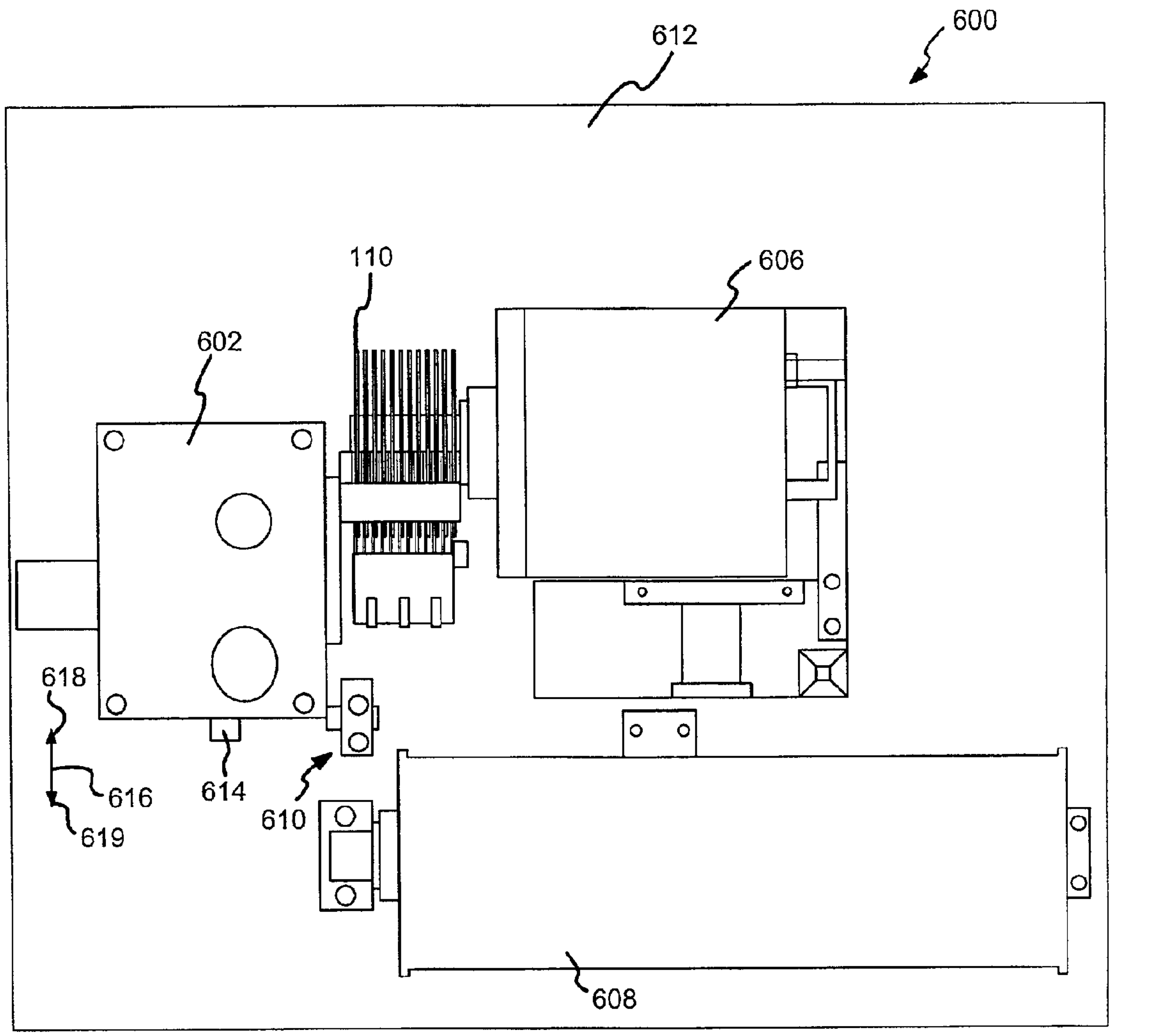
FIG. 6 shows a much more detailed (top) view of the STW of FIGS. 3–5.

FIG. 6 shows a much more detailed view of a servo writer 600 implementing the present invention. The writer 600 has several components supported by a substantially immobile and horizontally positioned platform 612. The platform 612 is substantially resistant to movements from impact type collisions, preferably implemented as a granite slab or comparably heavy material weighing tens or hundreds of pounds. A sliding assembly 602 is connected to the platform 612 via a slide mechanism 614 for lateral movement (as indicated by arrow 616) over the platform 612 between a servo recording position 618 and a component access position 619, as is discussed in greater detail below. The spindle motor hub assembly 606 and vacuum chuck 608 are directly and non-moveably secured to the platform 612.

In the preferred embodiment as shown, the sliding assembly 602 and the spindle hub assembly 606 of the STW 600 are both upright. Thus, the plurality of discs 110 secured to the spindle hub assembly 606 are vertically positioned relative to the platform 612. It is believed that the substantially vertical orientation of the discs 110 improves the accuracy of the servo pattern that is written to each of the discs by the STW 600, as explained in greater detail below. Similarly, the sliding assembly 602 includes a rotary actuator 320 (see FIG. 3) having a plurality of actuator arms 824 (see FIG. 8) that are also arranged for movement in substantially vertical planes relative to the platform 612. Each actuator arm 824 includes one or more flexures 826 connecting a distal end of the actuator arm to a corresponding one of the servo-writing heads 804. The vertical orientation of the actuator arms 824 also increases the accuracy of the servo writing process as described below.

FIG. 6 illustrates the STW 600 in the load/unload position 619 where the sliding assembly 602 has been moved away from the spindle hub assembly 606 via the slide mechanism 614. In this position, a stack of discs 110 may be loaded onto spindle hub assembly 606 to start the servo writing process. The spindle hub assembly 606 optionally includes a detachable spindle hub 828 (of FIG. 8) so that the hub 828 and the stack of discs 110 may readily be detached from a spindle motor (not shown in FIG. 8) to ease the process of loading and unloading the discs 110 from the spindle hub 828.

Figure 8:
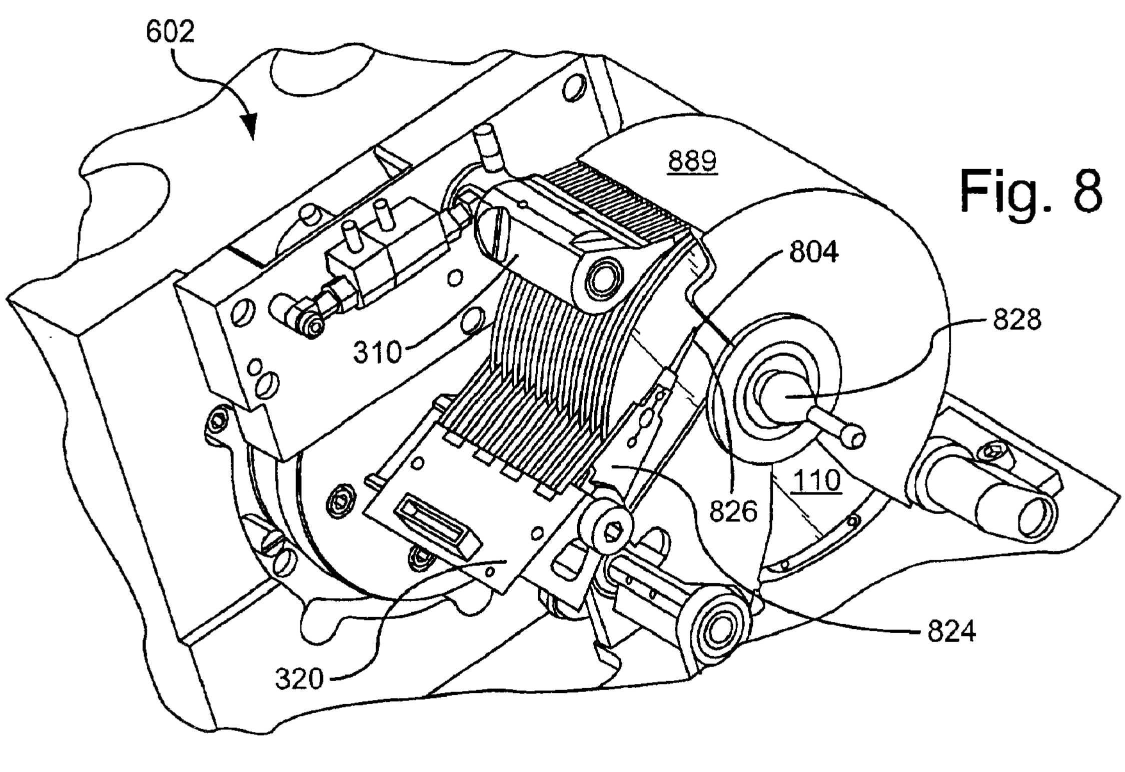
FIG. 8 shows a detailed magnified view of the stack of discs, the actuator and the support structure in a loaded position.

Once the discs 110 have been loaded on the spindle hub assembly 606 with a predetermined gap between adjacent discs, the discs 110 are secured to the spindle hub assembly 606 by means of a clamp ring 730. The sliding assembly 602 is then preferably moved laterally along the platform 612 (in the direction of arrow 616) toward the spindle hub assembly 606. While the flexures 826 on each of the actuator arms 824 tend to bias their corresponding heads 804 as is well known in the art, a support element 310 is used to maintain proper separation between the heads 804 so that the sliding assembly 602 and the disc stack on the spindle hub assembly 606 may merge without unintentional contact between the heads 804 and the discs 110. The support element 310 preferably moves together with the sliding assembly 602 as shown in FIG. 8 and acts to separate the heads 804 against the bias force of the flexures 826. Once the sliding assembly 602 is locked into the servo writing position 618 so that the heads 804 are positioned within the gaps between the adjacent discs 110, the support element 310 is rotated away from the actuator 320 to allow the heads 804 to engage their respective discs as a result of the bias force provided by the flexures 826. Of course, the heads 804 do not make physical contact with the data regions of their respective disc surfaces. Rather, the spindle hub assembly 606 is activated to spin the discs 110 at a predetermined rate prior to disengaging the support element 310. As described above, the rotational motion of the discs 110 generates wind so that the heads 804 ride an air bearing in lieu of actually contacting the disc surface. This air bearing counters the bias force applied by the flexures 826 and protects the fragile magnetic coatings on the disc surfaces.

Once the support element 310 is removed so that the heads 804 are fully engaged with their respective discs 110, servo writing signals are applied to the heads 804 to begin the process of recording the servo pattern. During the recording process, the actuator 320 is rotated about a horizontal axis by a motor and bearing assembly within the sliding assembly 602 so that the heads 804 move radially across the surface of their respective discs 110. The position of the heads 804 is determined by the laser interferometer 610 which utilizes interferometric techniques to track movement of the heads along the disc radius, and the interferometer 610 sends position signals back to control the operation of the sliding assembly 602 and thus the radial position of the heads 804.

Upon completion of the servo writing process, the actuator 320 is rotated back to position the heads 804 adjacent an outer circumference of the discs 110, while the support element 310 is rotated into contact with the flexures 826 to disengage the heads 804 from the discs 110. The sliding assembly 602 is then moved laterally away from the spindle hub assembly 606 to the load/unload position 619 so that the discs 110 (complete with their newly written servo patterns) can be removed from the spindle hub assembly 606 and ultimately installed in the disc drive 100.

Advantageously, the vertical orientation of the sliding assembly 602 prevents the force of gravity from pulling the heads 804 downward. This is important both during the loading and unloading of the heads 804 onto the discs 110 as well as during the servo writing process itself. For instance, while the support element 310 acts to separate the heads 804 prior to the loading process, it is noted that the support element 310 typically contacts the flexures 826 rather than the fragile heads 804 located at a distal end of the flexures 826. Thus, with horizontally-oriented STWs, the force of gravity may tend to pull the heads 804 downward below the level of the individual support element arm or tine, thereby creating a danger of inadvertent contact between the hanging head 804 and the disc 110 prior to the disengagement of the support element 310 from the flexures 826. This danger is avoided in the current invention since the force of gravity does not tend to pull the heads 804 in the direction of the discs. Additionally, during the servo writing process utilizing the present invention, the force of gravity does not tend to pull the heads 804 either toward or away from their respective disc surfaces as in the prior art. That is, in a horizontally-oriented STW, half of the heads are typically positioned adjacent a top surface of a disc, while the other half of the heads are positioned adjacent a bottom surface of a disc. For those heads positioned above their respective discs, the force of gravity on the flexure 826 and the head 804 acts in conjunction with the preload force generated by the flexure 826, while for those heads positioned below their respective discs the force of gravity acts against the preload force. This dichotomy can create fluctuations in the preload force for the different heads within the STW which ultimately leads to discrepancies in the "fly height" of the head over the disc surface. While the preload force provided by the flexure is typically much greater than the weight of the flexure and head combined, even minor discrepancies in the fly height of the head during the servo writing process can lead to errors in the servo pattern.

In addition to the above-described benefits relating to the substantially vertical orientation of the sliding assembly 602 (i.e., the movement of the actuator arms 824, the flexures 826 and the heads 804 in a vertical plane), the substantially vertical orientation of the discs 110 on the spindle hub assembly 606 also provides benefits over prior art horizontally-oriented STWs. Specifically, while the discs 110 are formed from a relatively stiff material (such as aluminum), the discs are nonetheless subject to gravity-induced warping, particularly along the outer circumference of the discs. As described above, even miniscule amounts of disc warpage can lead to unacceptable servo-writing errors, particularly in light of the higher track densities utilized with the discs. However, by maintaining the discs 110 in a vertical orientation during the servo writing process, the force of gravity does not act to pull the disc surface from its nominal vertical plane. Thus, the vertical orientation of the STW 600 of the present invention (i.e., the substantially vertical orientation of both the sliding assembly 602 and the discs 110) provides a number of benefits over prior art horizontally-oriented STWs.

Figure 7:
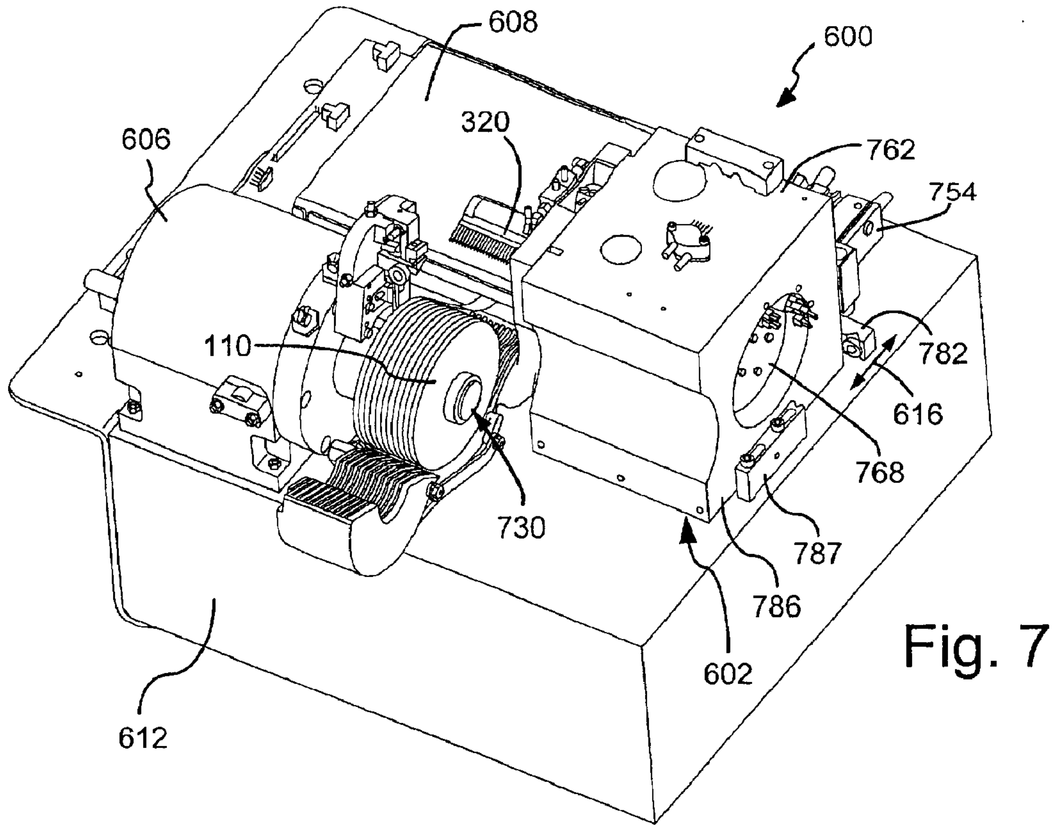
FIG. 7 shows a detailed perspective view of the STW of FIGS. 3–5.

A perspective view of the sliding assembly 602 in relation to the STW of FIG. 6 is shown in FIG. 7. The sliding assembly 602 includes a sliding block 762 housing a rotational air bearing and a translational air bearing (not labeled), an actuator 320 that includes an E-block, several actuator arms 240 carrying recording heads 140 thereon, a DC torque, brushless motor 768 or like motor for actuating the rotational air bearing 152, a sliding mechanism 754 for translational movement of the sliding block 762, and a laser transducer assembly for coordinating the motor's movement with the servo recording head's position.

The slide mechanism 754 is used, in coordination with the translational air bearing, to laterally move the sliding assembly 602 over the platform 612 toward and away from the spindle motor hub assembly 606. The slide mechanism 754 attaches to a lower edge of a side face of the sliding assembly 602, and preferably to a lower edge of the side face adjacent the vacuum chuck. The slide mechanism 754 includes a pneumatically sliding cylinder attached to the platform 612 by a flexure or bracket. A pair of stops 782 extend along the lower edge of the side face of the sliding block 762 on opposite sides of the actuator block attached sliding mechanism. Each stop 782 extends beyond the front face and back face 786 of the sliding block 762. A pair of catch block 787 is positioned on the platform 612 on opposite sides of the sliding block 762 to contact each stop when the sliding mechanism 754 laterally moves the sliding assembly 602 to the servo recording position on the platform.

FIG. 8 shows a magnified view of the stack of discs 110, the actuator 320, and the support structure 310 positioned to permit the servo-writing heads 804 to operate. Notice that the clamshell-shaped air dam 889 protrudes between the discs and that the support structure 310 does not, in this position.

Alternatively characterized, a first embodiment of the present invention is an apparatus (such as 100, 600) for writing position data onto a first data storage disc (such as 110). A spindle assembly (such as 606) is configured to support first and second discs (such as 110) rotatably in a stack. An actuator (such as 320) is configured to support a servowriter head (such as 804) between the discs to write several servo marks onto a data surface of the first disc (such as in step 220). A support element (such as 310) is configured to allow sliding contact with the actuator to unload the servowriter head from the data surface (such as contain tracks 112). The embodiment further includes means for retracting the actuator and the support element from between the first and second discs. Such means may be an engagement surface of a cam structure configured to support the actuator while the cam structure rotates out from between the first and second discs.

In a second embodiment, the stack has a substantially horizontal axis of rotation. The support element optionally had a substantially parallel axis of rotation, although it is conceivable that the support element may be linearly actuated. The support element may also be a rotary actuator having an axis of rotation skewed to that of the disc stack, such as that of U.S. Pat. No. 5,283,705 ("Head Retraction Mechanism for a Magnetic Disk Drive") issued Feb. 1, 1994 to Masanori Iwabuchi.

In a third embodiment, the actuator is rigidly but rotatably supported by a first rigid body (such as 602). The spindle assembly is likewise rigidly but rotatably supported (by a second rigid body such as 612). Automated means such as an air bearing/vacuum chuck mechanism are provided for coupling the first and second rigid bodies together temporarily during a servowriting operation.

A fourth embodiment is a method for writing position data. Several discs, preferably at least 8, are assembled coaxially in a stack (such as in step 210). A servowriter head supported by an actuator writes several servo marks onto the data surface (such as in step 220). The actuator is moved out from between the discs by sliding (an arm of) the actuator onto an engagement surface of a support element (such as 310) that extends between the first and second discs. The support element is moved out from between the to discs as the actuator slides on the engagement surface (such as in steps 235 and 240). After these movements, the discs can easily be removed from the stack (such as in step 250).

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the position data written can take the form of a pattern of holes in the magnetic media, rather than being written as a pattern of magnetized portions of the disc, without departing from the scope and spirit of the present invention. In addition, although the preferred embodiments described herein are largely directed to magnetic disc drives, it will be appreciated by those skilled in the art that many teachings of the present invention can be applied to optical and magneto-optical disc drives without departing from the scope and spirit of the present invention.

What is claimed is:

1. An apparatus for writing position data onto a first data storage disc comprising:

a spindle assembly configured to support first and second discs rotatably in a stack;

an actuator configured to support a servowriter head between the discs to write several servo marks onto a data surface of the first disc;

a support element configured to allow sliding contact with the actuator to unload the servowriter head from the data surface; and means for retracting the actuator and the support element from between the first and second discs.

2. An apparatus according to claim 1 in which the discs have a nominal radius R and in which the support element is constructed and arranged to extend between the first and second discs by a distance greater than R/10.

3. An apparatus according to claim 1 in which the support element is a rotary cam structure, and in which the retracting means is an engagement surface configured to support the actuator while the cam structure rotates out from between the first and second discs.

4. An apparatus according to claim 3 in which the discs have a nominal radius R and in which the support element is constructed and arranged to extend between the first and second discs by a distance greater than R/10.

5. An apparatus according to claim 1 in which the actuator is rigidly but rotatably supported by a first rigid body, in which the spindle assembly is rigidly but rotatably supported by a second rigid body, and further comprising automated means for coupling the first and second rigid bodies temporarily during a servowriting operation.

6. An apparatus according to claim 5 in which the support element is a rotary cam structure, and in which the retracting means is an engagement surface configured to support the actuator while the cam structure rotates out from between the first and second discs.

7. An apparatus according to claim 5 in which the discs have a nominal radius R and in which the support element is constructed and arranged to extend between the first and second discs by a distance greater than R/10.

8. An apparatus according to claim 1 in which the stack has a substantially horizontal axis of rotation.

9. An apparatus according to claim 8 in which the support element has a substantially horizontal axis of rotation.

10. An apparatus according to claim 8 in which the actuator is rigidly but rotatably supported by a first rigid body, in which the spindle assembly is rigidly but rotatably supported by a second rigid body, and further comprising automated means for coupling the first and second rigid bodies temporarily during a servowriting operation.

11. An apparatus according to claim 8 in which the support element is a rotary cam structure, and in which the retracting means is an engagement surface configured to support the actuator while the cam structure rotates out from between the first and second discs.

12. An apparatus according to claim 8 in which the discs have a nominal radius R and in which the support element is constructed and arranged to extend between the first and second discs by a distance greater than R/10.

13. A method for writing position data comprising steps of:

(a) assembling first and second discs coaxially in a stack, the first disc having a first data surface facing the second disc;

(b) writing several servo marks onto the data surface with a servowriter head supported by an actuator;

(c) moving the actuator out from between the first and second discs by sliding the actuator onto an engagement surface of a support element that extends between the first and second discs; and (d) moving the support element out from between the first and second discs as the actuator slides on the engagement surface.

14. A method according to claim 13 in which the writing step (b) includes a step (b1) of sliding the actuator along a portion of the engagement surface that approaches the first disc at an approach angle of less than about 25 degrees relative to the disc surface until the actuator disengages from the support element.

15. A method according to claim 14 in which the servowriter head is constructed and arranged to fly at a median distance of less than one microinch from the data surface while writing the servo marks.

16. A method according to claim 13 in which the writing step (b) includes a step (b1) of sliding the actuator along a portion of the engagement surface that approaches the first disc at an approach angle of 4 to 10 degrees relative to the disc surface until the actuator disengages from the support element.

17. A method according to claim 13 in which the writing step (b) includes steps of:

(b1) loading the servowriter head adjacent the first data surface while the disc stack rotates at an initial speed; and (b2) rotating the disc stack at least 5% slower than at the initial speed while the head writes the several servo marks onto the data surface.

18. A method according to claim 17 in which the writing step (b) further includes a step (b3) of sliding the actuator along a portion of the engagement surface that approaches the first disc at an approach angle of 4 to 10 degrees relative to the disc surface until the actuator disengages from the support element.

19. A method according to claim 13 in which the actuator movement step (c) is performed by rotating the actuator within a fixed angular range having two extreme positions.

20. A method according to claim 19 in which the support element movement step (d) is performed while holding the actuator at one of the extreme positions.

21. A method according to claim 19 in which the writing step (b) includes a step (b1) of sliding the actuator along a portion of the engagement surface that approaches the first disc at an approach angle of less than about 25 degrees relative to the disc surface until the actuator disengages from the support element.

22. A method according to claim 13 in which the support element movement step (d) is performed by rotating the support element about an axis of rotation.

23. A method according to claim 13 in which the support element movement step (d) is begun after the actuator is moved out from between the first and second discs.

24. A method according to claim 13 in which the actuator movement step (c) and the support element movement step (d) overlap.

25. A method according to claim 13 in which the discs have a nominal radius R, and in which the actuator and the support element continuously remain with a distance of R/10 of the discs throughout performing the steps (b) through (d).

26. A method according to claim 13 in which the removing step (e) begins by moving the discs axially.

27. A method according to claim 13 further comprising steps of:

(f) installing the first disc into a disc drive; and (g) after the installing step (f), using the servo marks to position a transducer while the transducer writes additional position data onto the data surface.

28. A method according to claim 27 in which the writing step (b) includes a step (b1) of sliding the actuator along a portion of the engagement surface that approaches the first disc at an approach angle of less than about 25 degrees relative to the disc surface until the actuator disengages from the support element.

29. A method according to claim 27 in which the support element movement step (d) is begun after the actuator is moved out from between the first and second discs.

30. A method according to claim 27 in which the removing step (e) begins by moving the discs axially.

31. A retractable load/unload ramp for selectively loading and unloading a data transfer head, the ramp moveable between a retracted position away from a data storage media and an extended position adjacent the data storage media, the ramp moveable independently of an actuator moving the head beyond an outer edge of the data storage media.

* * * * *

UNITED STATES PATENT AND TRADEMARK OFFICE

CERTIFICATE OF CORRECTION

PATENT NO. : 6,952,319 B2
APPLICATION NO. : 10/003506
DATED : October 4, 2005
INVENTOR(S) : Brent M. Weichelt et al.

It is certified that error appears in the above-identified patent and that said Letters Patent is hereby corrected as shown below:

Title page,
Item [75], Inventors, replace "Brent Melvin Weiehelt" with
-- Brent Melvin Weichelt --.

Signed and Sealed this

Twentieth Day of June, 2006

JON W. DUDAS
*Director of the United States Patent and Trademark Office*